Aug. 4, 1931.　　J. D. GABRIEAU　　1,817,306
DITCH TRIMMER
Filed Aug. 15, 1929　　3 Sheets-Sheet 1
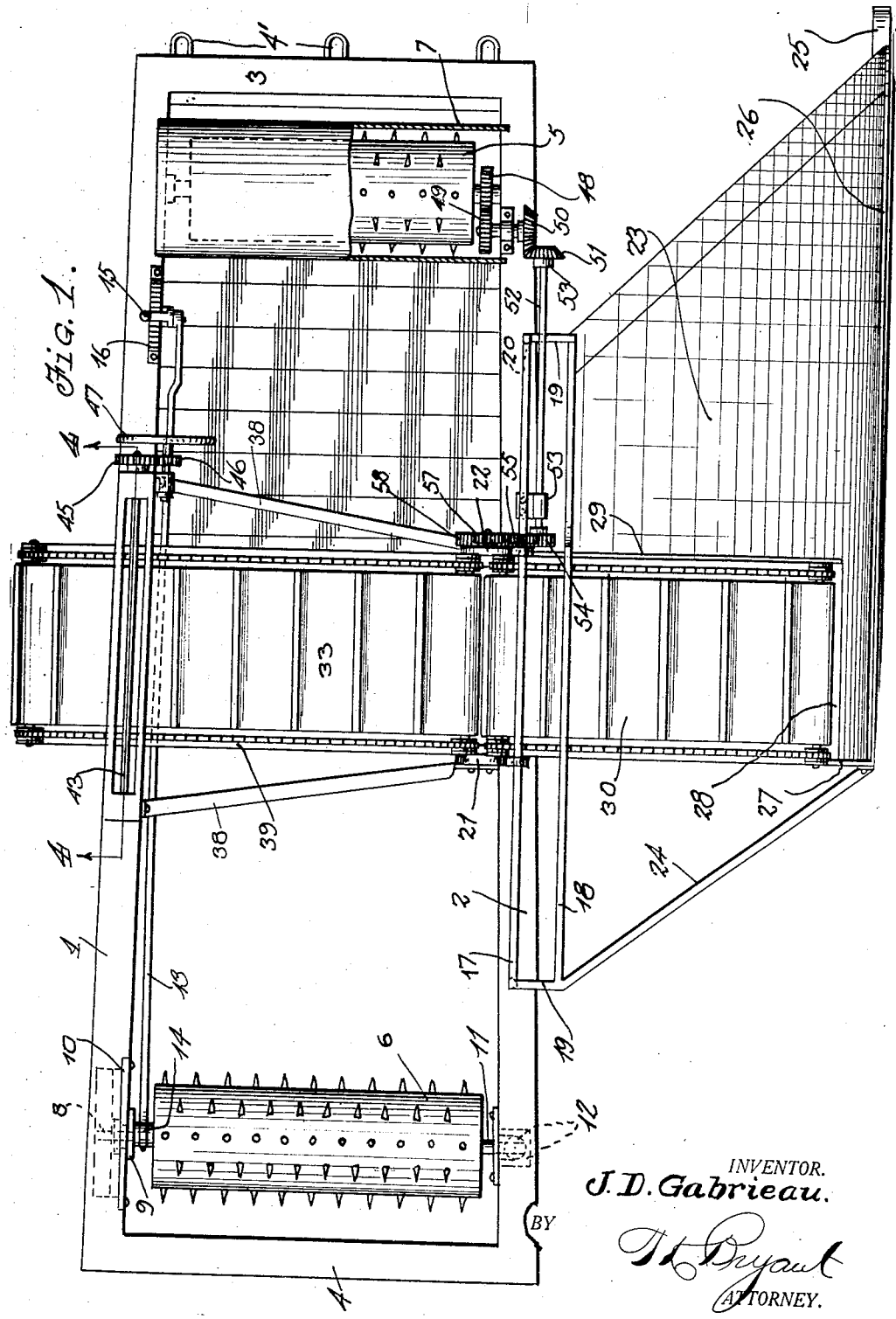
INVENTOR.
J. D. Gabrieau.
BY
T. L. Bryant
ATTORNEY.

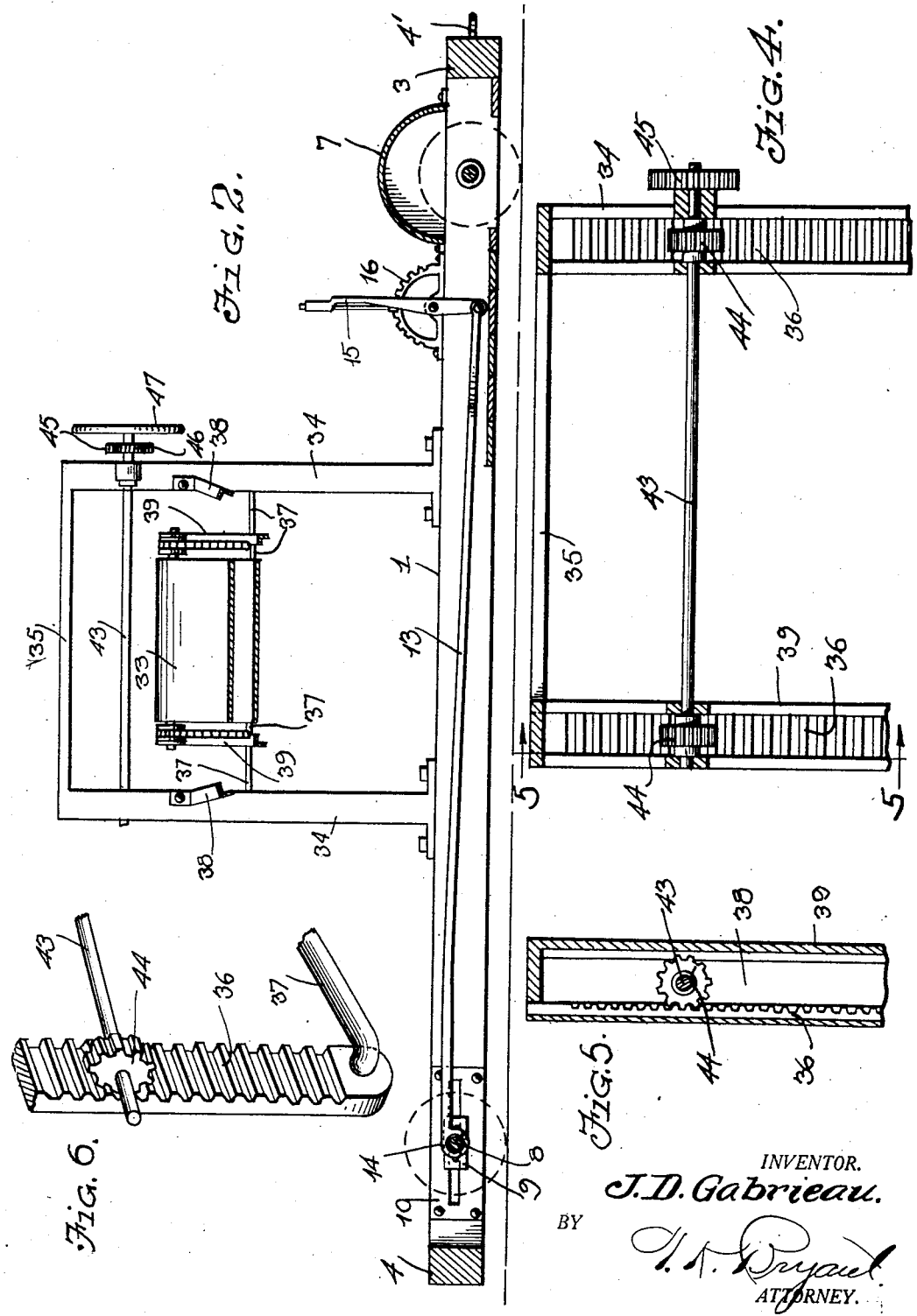

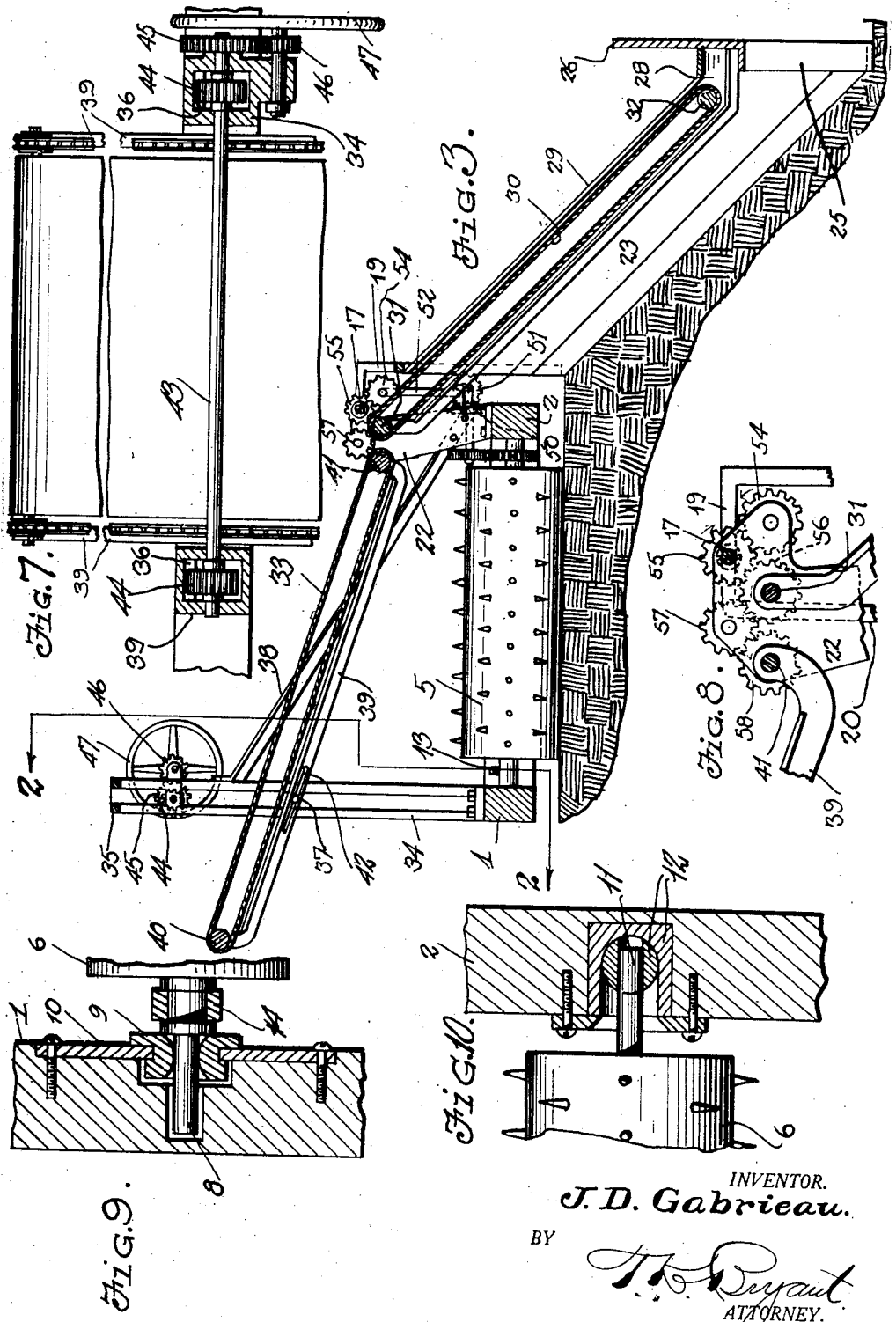

Patented Aug. 4, 1931

1,817,306

UNITED STATES PATENT OFFICE

JOSEPH D. GABRIEAU, OF RICHLAND, WASHINGTON

DITCH TRIMMER

Application filed August 15, 1929. Serial No. 386,160.

This invention relates to certain new and useful improvements in ditch trimmers.

The primary object of the invention is to provide a trimmer, evener or smoothener for the inclined side walls of ditches, irrigation canals, drain ditches, trenches, streams or canals for the removal of sod, weeds, vegetation upon such inclined walls or other débris collected thereon.

A further object of the invention is to provide a trimmer for the inclined side walls of ditches or the like, wherein a suitably propelled or drawn frame structure travelling over a path at the upper side of the ditch has a depending inclined plow or scraper for cleaning the inclined side wall of the ditch and depositing the débris onto an endless conveyor for discharge laterally of the apparatus, traction rollers constituting the ground supporting means for the frame structure and the driving power for the endless conveyor.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view of a ditch trimmer constructed in accordance with the present invention, showing the traction roller supported frame, the lateral depending inclined plow and the two cooperating endless conveyors;

Figure 2 is a vertical longitudinal sectional view taken on line 2—2 of Figure 3, showing the forward control of the rear traction steering roller;

Figure 3 is a vertical cross-sectional view, showing the machine operatively positioned relative to the ground line and the inclined side wall of a ditch or the like;

Figure 4 is a detail sectional view taken on line 4—4 of Figure 1, showing the rack and pinion devices for vertically adjusting the outer end of the discharge conveyor;

Figure 5 is a vertical cross-sectional view taken on line 5—5 of Figure 4;

Figure 6 is a fragmentary perspective view of the rack and pinion devices;

Figure 7 is an enlarged detail sectional view taken through Figure 3;

Figure 8 is a fragmentary elevational view of the gear drive for the two conveyors;

Figure 9 is a detail sectional view showing the swingingly mounted end of the rear steering roller; and Figure 10 is a detail sectional view showing the pivoted end of the rear steering roller.

Referring more in detail to the accompanying drawings, there is illustrated a ditch trimmer comprising a frame structure including side bars 1 and 2 connected by front and rear cross-bars 3 and 4 respectively, the forward cross-bar 3 being provided with one or more draft elements 4' to which a traction device may be attached. The frame structure is supported upon traction rollers 5 and 6 journaled in the side bars 1 and 2 adjacent the front and rear ends thereof respectively, each roller 5 having ground engaging spurs to aid in traction. The front traction roller 5 is suitably journaled in bearings in the side bars 1 and 2 and is covered by a casing or hood 7. The mounting for the rear traction roller 6 is shown in detail in Figures 9 and 10.

Steering of the machine frame is accomplished by the rear traction roller 6 which will hereinafter be referred to as the steering roller, one shaft end 8 of the steering roller 6 being journaled in a bearing collar 9 that is U-shaped in cross-section to engage and be confined by the walls of a longitudinal slot in the side plate 10 carried by the frame bar 1. The other shaft end 11 of the steering roller 6 has a universal mounting 12 in the frame bar 2. A relatively long link rod 13 extends longitudinally of the side bar 1 and is engaged at its rear end as at 14, as shown in Figures 2 and 9 with the axle end 8 of the steering roller 6, the forward end of the link rod 13 being connected to the lower end of the lever 15 that has a tensioned dog cooperating with the rack segment 16. Upon operating the lever 15, the link rod 13 is shifted for moving the axle end 8 of the steering roller 6 through the slotted opening in the bearing plate 10 to effect steering of the machine frame.

A mechanism supporting frame is associated with the side bar 2 of the machine frame and comprises a pair of longitudinally extending rods 17 and 18 connected at their ends by cross-rods 19, the ends of the rod 17 being supported on the side bar 2 by posts 20 shown more clearly in Figures 1 and 8 and also by bracket arms 21 and 22 mounted on the bar 2 and spaced from each other as shown in Figure 1. A scraper or plow 23 is supported by the rod 18 with the rear corner edge thereof braced by the angle rod 24 while an outer edge runner 25 is carried by the plow having an upturned forward end. The outer or lower and rear side edges of the plow 23 are provided with perpendicular guard walls 26 and 27 respectively for purposes presently to appear. The blade of the plow 23 is provided with a rectangular opening 28 adjacent its rear end with the forward side of the opening 28, as shown in Figure 1, carrying a perpendicular guard wall 29 for directing the débris collected by the plow toward the lower guard wall 26 and to the rear end of the plow.

An endless conveyor is disposed above the opening 28 of the plow 23 and is inclined upwardly from the lower edge of the plow to terminate at its upper end above the side bar 2 of the frame structure, the endless conveyor 30 being supported at its ends on shafts 31 and 32, the shaft 31 being journaled at its ends in the brackets 22 and 21 while the shaft 32 is journaled in the guard walls 27 and 29. A second conveyor 33 is disposed above the frame structure, the lower end thereof being disposed adjacent the upper end of the conveyor 30 while the upper end is vertically adjustable and extends laterally of the frame structure for discharge of débris received thereon from the conveyor 30.

The supporting structure for the upper end of the endless conveyor 33 comprises a pair of hollow rectangular standards 34 mounted upon the side bar 1 and connected at their upper ends by the cross brace 35. A rack bar 36 is vertically slidable in each hollow standard 34 and said rack bars are connected at their lower ends by a cross-rod 37 extending through side openings 38 in the hollow standards as shown in Figures 2 and 6. The hollow standards are braced by angle irons 38 extending from the upper ends thereof to the side bar 2 to provide a rigid mounting for the standards and to eliminate shocks and vibrations when the rack bars 36 are raised and lowered. The endless conveyor 33 is carried by angle irons 39 at each side thereof, the endless conveyor 33 travelling over rollers 40 and 41, the roller 40 being journaled in the upper end of the angle irons 39 while the lower roller 41 is journaled in the brackets 21 and 22, the lower ends of the angle irons 39 being pivotally supported on the ends of the roller 41. Each angle iron 39 is provided with a longitudinally extending slot 42 through which the shaft 37 extends and when said rack bars 36 are raised and lowered, the shaft 37 slides through the slots 42 during the raising and lowering movement of the upper end of the conveyor 33.

The rack bars 36 are manually operated by the cross-shaft 43 journaled in bearings in the hollow standards 34 adjacent their upper ends, each hollow standard 34 housing a pinion 44 fixed to the shaft 43 that is engaged with the adjacent rack bar while the shaft 43 is operated by the gear 45 fixed to one projecting end thereof that is in meshing engagement with a pinion 46 that is driven by the hand wheel 47.

The operating means for the endless conveyors 30 and 33 includes the forward traction roller 5, one axle end thereof having a gear 48 fixed thereto that meshes with a gear wheel 49 carried by a shaft journaled on the side bar 2 of the frame structure, the gear wheel 49 operating the bevel gear 50 that meshes with the bevel gear 51 upon the shaft 52 journaled in brackets 53 on the side bar 2. The other end of the shaft 52 carries a pinion 54, it being noted that the said end of the shaft 52 is further journaled in the bracket 22, the pinion 54 meshing with the pinion 55 that in turn meshes with the pinion 56 fixed to the conveyor roller 31. The pinion 56 meshes with the pinion 57 which in turn meshes with the pinion 58 that is fixed to the shaft 41 of the endless conveyor 33, the drive for the endless conveyors 30 and 33 being through the train of gearing and shaft described and operated by the forward traction roller 5.

From the above detailed description of the invention, it is believed that the construction and operation thereof will at once be apparent, it being noted that débris and the like gathered by the plow 23 is delivered to the lower end of the conveyor 31 and carried by the same in an upward direction to the conveyor 33 from which the débris and the like is laterally discharged relative to the frame structure as will at once be evident from an inspection of Figures 1 and 3, and while there is herein shown and described the preferred embodiment of the invention, it is nevertheless to be understood that minor changes may be made therein without departing from the spirit and scope of the invention as claimed.

I claim:—

1. In a machine for cleaning the inclined side wall of a ditch, canal or the like, a machine frame adapted to travel along the bank of the ditch, ground traction rollers on the frame, a plow for the inclined side wall of the ditch angularly depending from the frame and cooperating endless conveyors, one disposed above the plow to be charged with material thereby and the other disposed above the frame to receive material from the lower conveyor for discharge laterally of the frame, and means operated from the front end of the frame for shifting one roller to effect steering of the frame.

2. In a machine of the character described, a traveling frame mounted on front and rear traction rollers, a set of endless conveyors, operative connections between the front traction roller and the endless conveyors, side angle irons carrying one of the conveyors, a vertically adjustable rack bar at each side of said conveyor, a rod connecting the rack bars and engaged with the angle irons of the conveyor, said angle irons having slotted openings through which the rod extends, hollow standards enclosing the rack bars and a manually operable shaft journaled in the standards, having pinions engaged with the rack bar.

In testimony whereof I affix my signature.

JOSEPH D. GABRIEAU.